United States Patent
Gireesha et al.

(10) Patent No.: US 10,789,283 B2
(45) Date of Patent: Sep. 29, 2020

(54) SYSTEMS AND METHODS FOR NOTIFYING AN AUTHOR OF CONTEXTUAL SUGGESTED CONTENT

(71) Applicant: Google Inc., Mountain View, CA (US)

(72) Inventors: Jayakumar Hoskere Gireesha, Bangalore (IN); Shyam Parikkal Krishnamurthy, Bangalore (IN); Shruti Gupta, Bengaluru (IN); Anmol Gulati, New Delhi (IN); Luiz Do Amaral De Franca Pereira Filho, Jersey City, NJ (US); Andrea Zvinakis, New York, NY (US); Kishore Papineni, Carmel, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/622,951

(22) Filed: Jun. 14, 2017

(65) Prior Publication Data
US 2018/0365325 A1    Dec. 20, 2018

(51) Int. Cl.
*G06F 16/38* (2019.01)
*G06F 16/2457* (2019.01)
(Continued)

(52) U.S. Cl.
CPC ........ *G06F 16/38* (2019.01); *G06F 16/24578* (2019.01); *G06F 16/90324* (2019.01); *G06F 16/358* (2019.01); *G06F 40/10* (2020.01)

(58) Field of Classification Search
CPC ............... G06F 17/21; G06F 17/3053; G06F 17/30713; G06F 17/30722; G06F 17/3097
(Continued)

(56) References Cited

U.S. PATENT DOCUMENTS

| 7,475,344 B1 * | 1/2009 | Patil | G06F 3/0237 704/246 |
| 8,205,155 B2 * | 6/2012 | Trotter | G06F 17/2229 715/261 |

(Continued)

FOREIGN PATENT DOCUMENTS

| CA | 2867547 | 4/2015 |
| WO | 2015051450 A1 | 4/2015 |

OTHER PUBLICATIONS

Napier Lopez; Microsoft is using AI to give Office spell-check on steroids and much more; Jul. 26, 2016; thenextweb.com; pp. 1-5.*
(Continued)

*Primary Examiner* — Andrew R Dyer
(74) *Attorney, Agent, or Firm* — Lowenstein Sandler LLP

(57) ABSTRACT

Systems and methods are described to notify an author that suggested content is available. An author-assistance tool is instantiated with a document processor to perform research to suggest content for a document being edited at the document processor. A user interaction relating to a document is received via the document processor, and the author-assistance tool generates suggested content for the document when the author has intent for content suggestion or the document has a document type that is on a list of document types for which a content suggestion should be made. The author-assistance tool then determines that the suggested content meets a pre-determined quality threshold, and generates, via the user interface of the document processor, a notification to the author that the suggested content is available.

20 Claims, 8 Drawing Sheets

(51) Int. Cl.
*G06F 16/9032* (2019.01)
*G06F 16/35* (2019.01)
*G06F 40/10* (2020.01)

(58) Field of Classification Search
USPC .................................... 715/230, 243, 253
See application file for complete search history.

(56) References Cited

U.S. PATENT DOCUMENTS

| | | | | |
|---|---|---|---|---|
| 8,290,772 | B1 * | 10/2012 | Cohen | G06F 17/276 |
| | | | | 369/25.01 |
| 8,904,309 | B1 * | 12/2014 | Zhai | G06F 3/0482 |
| | | | | 715/773 |
| 9,135,250 | B1 * | 9/2015 | Duddu | G06F 17/30011 |
| 9,632,994 | B2 * | 4/2017 | Naim | G06F 17/241 |
| 2005/0102628 | A1 * | 5/2005 | Salesin | G06F 40/106 |
| | | | | 715/764 |
| 2007/0136657 | A1 * | 6/2007 | Blumenthal | G06F 17/241 |
| | | | | 715/201 |
| 2007/0150801 | A1 * | 6/2007 | Chidlovskii | G06F 17/2247 |
| | | | | 715/210 |
| 2008/0288862 | A1 * | 11/2008 | Smetters | G06F 17/218 |
| | | | | 715/255 |
| 2010/0042910 | A1 | 2/2010 | Manolescu et al. | |
| 2010/0138436 | A1 * | 6/2010 | Gupta | G06Q 30/00 |
| | | | | 707/759 |
| 2011/0072033 | A1 * | 3/2011 | White | G06F 16/3322 |
| | | | | 707/768 |
| 2012/0240025 | A1 * | 9/2012 | Migos | G06F 3/0488 |
| | | | | 715/230 |
| 2012/0297294 | A1 * | 11/2012 | Scott | G06F 17/273 |
| | | | | 715/261 |
| 2012/0324350 | A1 * | 12/2012 | Rosenblum | G06F 17/21 |
| | | | | 715/256 |
| 2016/0019301 | A1 | 1/2016 | Goldenstein et al. | |
| 2016/0132830 | A1 * | 5/2016 | Zhang | G06Q 10/105 |
| | | | | 705/320 |
| 2016/0147893 | A1 | 5/2016 | Mashiach et al. | |
| 2016/0192006 | A1 * | 6/2016 | Alfishawi | H04N 21/4668 |
| | | | | 725/32 |

OTHER PUBLICATIONS

PCT International Search Report and Written Opinion for International Application No. PCT/US2017/027760, dated Sep. 12, 2017, 15 pages.

* cited by examiner

SYSTEMS AND METHODS FOR NOTIFYING AN AUTHOR OF CONTEXTUAL SUGGESTED CONTENT

FIELD OF THE INVENTION

In general, this disclosure relates to intelligent content search; in particular, to systems and methods for notifying an author of contextual suggested content.

BACKGROUND

Writers at times may look at other content when they are writing in a document. A writer can use a word processing tool to write a document, while manually searching for information and/or content via a research or search tool, such as an Internet search engine, a local database, or library. For example, when an author is writing an article about the development of space technology and considering mentioning the name Neil Armstrong, the author can enter the name "Neil Armstrong" into a search field of an Internet search engine to search for factual information such as date of birth, education, work experience, and other biographical data about the astronaut. The manual search process can be rather inefficient, as the author needs to manually type in a query, read through a list of returned search results, and then choose the information content, which can slow down the writing process.

SUMMARY

Systems and methods disclosed herein provide a notification mechanism to inform the author via a user interface that suggested content is available for a document that the author is writing. An author-assistance tool is initiated with a document processor to perform research to suggest content for the document that is being edited at the document processor. A notification mechanism is used to determine whether and when the available suggested content is to be provided to the author. The notification mechanism first determines whether the author of the document being edited is interested in receiving suggested content suggestion based on the current author/document state. The notification mechanism further determines whether the suggested content is suitable for the document being edited, for example, whether the document has a document type that is on a list of document types for which a content suggestion should be made. The notification mechanism further determines whether the suggested content is of good quality. Thus, a notification that suggested content is available will be provided to the author only when the author has the intent to receive suggested content, the document has the document type that is on the list of document types for which a content suggestion should be made, and the suggested content has good quality. In this way, the author is provided with less unnecessary notifications of suggested content, and the user experience of assisted writing is improved.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

Figure 1:
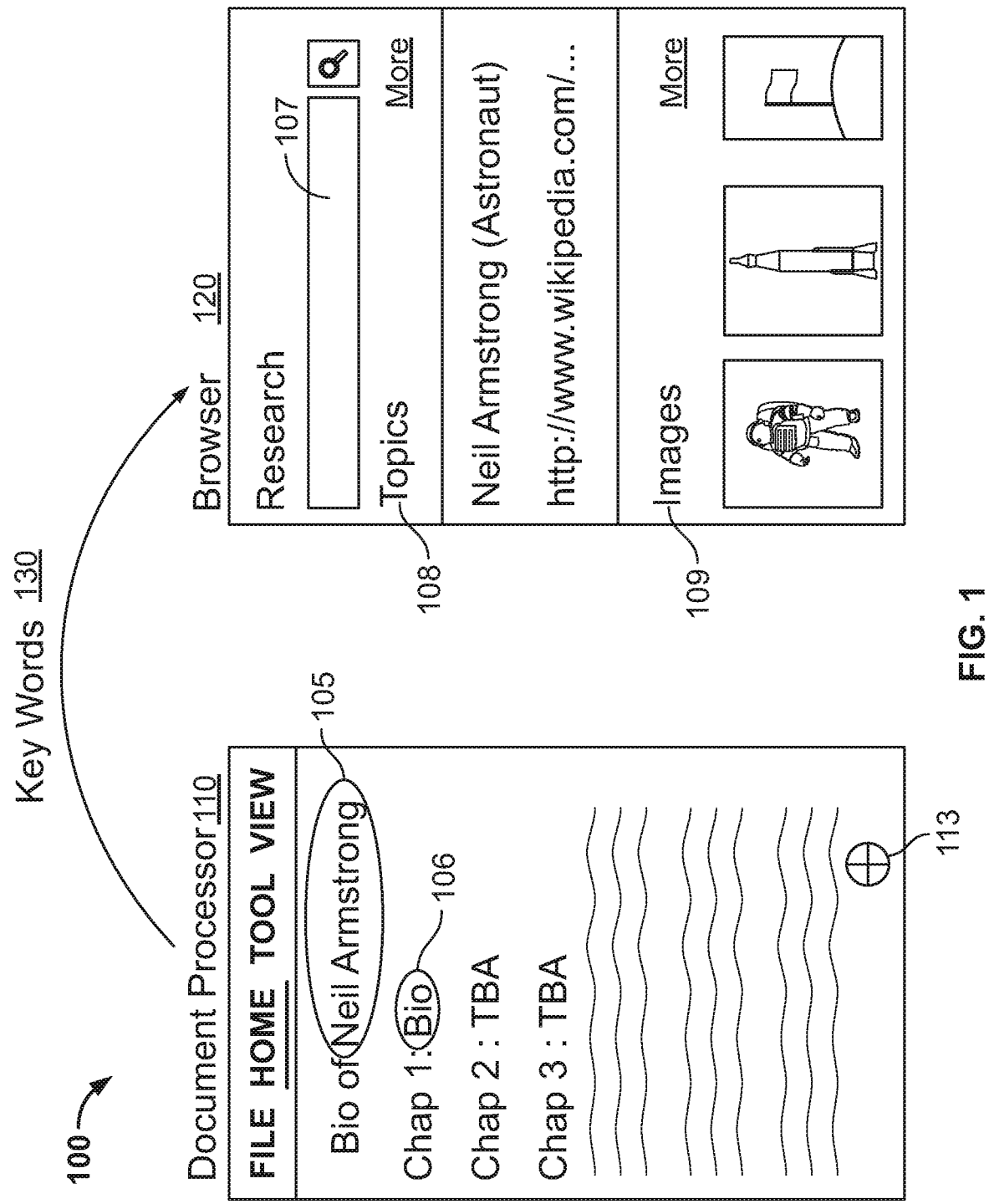
FIG. 1 provides an example block diagram illustrating aspects of an author-assistance tool having a notification mechanism instantiated within a document processor, according to some embodiments described herein.

To provide an overall understanding of the systems and methods described herein, certain embodiments will now be described, including a system and method for managing, editing, and sharing electronic documents stored on a local computing device, a remote server, or distributed storage servers. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The systems and methods described herein provide a notification mechanism to inform an author via a user interface that suggested content is available for a document that the author is editing. An author may use an intelligent author-assistance tool embedded with a document editing application to obtain suggested content. For example, the intelligent author-assistant tool analyzes the content that the author has written within a document processor and generates search terms based on the content to automatically perform a search. The search results may be provided to the author as suggested content to assist the writing experience of the author. A user interface widget, such as a display button at the bottom of a document processor, may be configured to notify the author that suggested content is ready for review. For example, whenever the widget changes display pattern from gray to a glowing or blinking pattern, or other visibly different patterns or display colors, the author can click on the widget to view the available suggested content. However, if the display button constantly notifies the author whenever new suggested content is ready, the author may be distracted from his or her own writing or editing of the document, and the actual usage of suggested content may not be desirable due to a lack of quality control.

To improve efficiency and usage of the suggested content, the notification mechanism described herein is configured to determine whether and when the available suggested content should be provided to the author. The notification mechanism first determines whether the author of the document being edited is interested in receiving suggested content suggestion based on the current author/document state. For example, if a document is actively being edited, the author may be interested in receiving suggested content. To the contrary, if the author manually turns off the author-assistant tool, the author may not be interested in receiving suggested content. Second, the notification mechanism further determines whether the suggested content is suitable for the document type, for example, whether the document being edited has a document type that is on a list of document types for which suggested content should be made. For example, if the document is research-related, such as a research paper, suggesting content on a related topic should be made. However, if the document is not research-related, such as the author's personal resume, suggesting content should not be made. Third, the notification mechanism further determines whether the suggested content is of good quality. For example, each suggested content item is assigned a numeric score to indicate the relevance and quality of the suggested content item. Thus, a notification that suggested content is available will be provided to the author only when the author has the intent to receive suggested content, the document has a document type that is on the list of document types for which a content suggestion should be made and the suggested content has good quality. In this way, the author is provided with less unnecessary notifications of suggested content, and the user experience of assisted writing is improved.

FIG. 1 provides an example block diagram 100 illustrating aspects of an author-assistance tool having a notification mechanism instantiated within a document processor, according to some embodiments described herein. FIG. 1 shows a user interface of a document processor 110, and a user interface of a browser 120 that is launched for an author-assistance tool embedded with the document processor 110 provides suggested content to an author. The document processor 110 has an editing area that the author may edit a portion of a document, for example, a "biography of Neil Armstrong" as shown at 105. When the author is writing about "Bio of Neil Armstrong" 105 within a document processor 110, the author may actively add to or edit the content of the document. In some implementations, the author may actively type on a keyboard to add textual content to the portion of the document displayed within the document processor 110. In another implementation, the author may paste content into the document processor 110, and/or the like. In another implementation, the author may insert links to online content into the document. In another implementation, the author may access Internet content via a browser to read more references to expand his or her knowledge of the content that is being written. The activities of the author may be captured by the document processor 110 as indications that the author has the intent to find content that is relevant to the document being written.

As the author is adding content to a document displayed within the document processor 110, the author-assistance tool automatically captures key words from the content being edited within the document processor 110 such as "Neil Armstrong" 105, "biography" 106, or the like, and uses such key words 130 to search for content that is related to the document being edited at the document processor 110.

The document processor 110 sends the key words 130 to a browser application 120, via which the author-assistance tool automatically conducts research based on the key words 130 in the background about Neil Armstrong or a related topic. When the author-assistance tool conducts searches in the background and accumulates search results, the author-assistance tool also assesses the quality of the researched and suggested content and evaluates whether the returned research result is worth providing to the author. Once a sufficient amount of suggested content is obtained, a notification button 113 within the document processor 110 may turn from gray to a visible pattern to notify the author that suggested content is ready.

When the notification button 113 is selected by the author, browser application window 120 is prompted to provide the suggested content to the author. In this example, the suggested content includes a section "Topics"108 that lists search topics related to the key word "Neil Armstrong" 105 captured from the document being edited, and under each search topic, lists the search results in response to the respective search topic. The suggested content further includes a section "Images" 109 that displays image search results related to the key word "Neil Armstrong" 105 captured from the document being edited. Various other types of content can be suggested, including but not limited to web sites, cloud content, social media posts, and/or the like. The browser window 120 also includes a search box 107 in which the author can enter additional search terms to launch his or her own search. The suggested content shown at 108 and 109 can be dynamically updated based on the author-entered search terms.

In other implementations, in addition to capturing terms such as "Neil Armstrong" 105 and "bio" 106 from the document that being edited, the author-assistance tool predicts a related topic that the author may be interested in but has not written about yet based on a topic written in the document. For example, when the author is writing about Neil Armstrong, the intelligent tool can find other topics and articles that are possibly related to Neil Armstrong; e.g., in addition to providing Neil Armstrong's biography, the intelligent tool may provide information on Buzz Aldrin, Michael Collins, Apollo 11, the history of NASA, famous space missions, Tranquility Base, and/or the like. In some implementations, the suggested content and topics can be constantly and dynamically updated as the author writes more content, thus forming a tight write-learn-write loop. In this way, the author-assistance tool can automatically bring the content relevant to the author's writing to the author without the author having to manually come up with search terms to conduct an Internet search for his or her writing.

Figure 2:
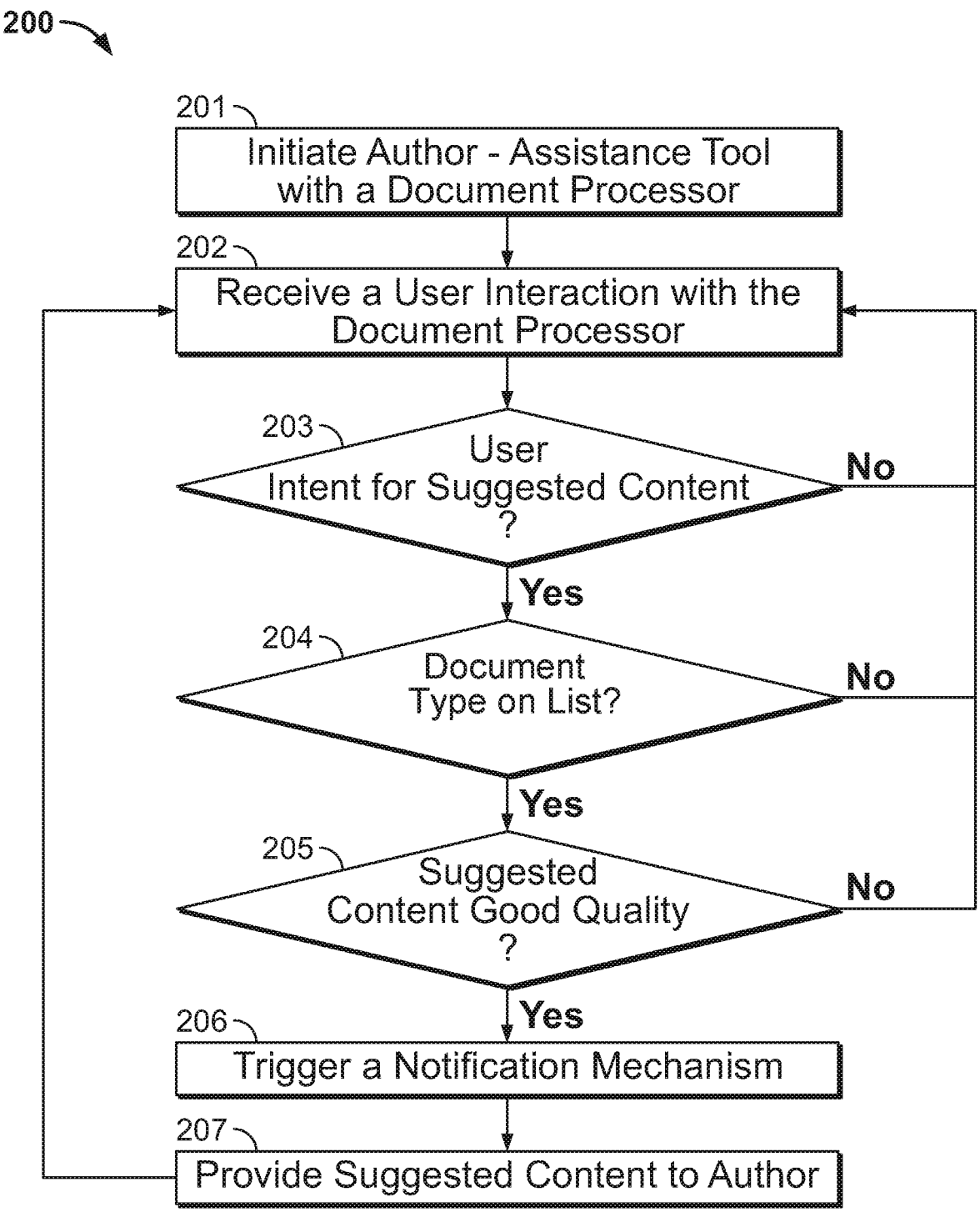
FIG. 2 provides an example logic flow diagram illustrating a work flow for triggering a notification mechanism within the author-assistance tool, according to some embodiments described herein.

FIG. 2 provides an example logic flow diagram 200 illustrating a work flow for triggering a notification mechanism within the author-assistance tool, according to some embodiments described herein. At 201, an author-assistance tool can be initiated with a document processor. In some implementations, an author may manually turn on the author-assistance feature embedded within a document processor, e.g., by configuring settings of the document processor. In another implementation, the author-assistance tool may be turned on automatically when a document is opened within the document processor, etc. At 202, a user interaction is received at the document processor, e.g., opening a document, creating a new document, editing the document by adding or deleting contents, changing the format of the document, etc. The author-assistance tool identifies such user interaction as an indication that the author is working on the document, and then determines whether and when suggested content is to be generated and provided to the author.

At 203, the author-assistance tool determines whether there is user intent for suggested content, e.g., based at least in part on the user interaction with the document. For example, if the author manually turns off the author-assistance tool within the document processor settings, the author has no intent to receive suggested content. In some implementations, if the author-assistance tool determines the author has no intent to receive suggested content, the author-assistance tool may opt not to perform any automatic search for suggested content at all. In other implementations, the author-assistance tool may opt to perform a search in the background without notifying the author, such that when the author manually clicks on the notification button (e.g., the button 113 in FIG. 1), suggested content can be provided upon author request.

When no user intent of suggested content is determined at 203, the author-assistance tool continues monitoring user interactions with the document at 202. When user intent of suggested content is determined at 203, the author-assistance tool moves on to generate suggested content, and then determine whether any suggested content is suitable for the document, for example, whether the document being edited has a document type that is on a list of document types for which a content suggestion should be made at 204, for example, whether the document is a research-type document. For example, the author-assistance tool determines a type of the document, and compares the type of the document against a list of document types for which a content suggestion should be made. The list of document types may include pre-determined research-related document types. The list of document types may also be dynamically updated based on user feedback. For example, if the author incorporates any suggested content that is presented to him or her into a document, the document is considered to have a document type for which a content suggestion should be made. The type of the document may then be added to the list of document types for which a content suggestion should be made.

At 204, for example, when the author-assistance tool determines that the document type is not on the list for which a content suggestion should be made, indicating the instant document may not need any content suggestion, the author-assistance tool continues monitoring user interactions with the document at 202. In this example, when the author-assistance tool determines that the document type is on the list for which a content suggestion should be made, e.g., the instant document is a research-type document for which suggested content should be made at 204, the author-assistance tool continues performing search to obtain suggested content and also moves on to determine whether the suggested content is of good quality to trigger a notification at 205.

At 205, when the author-assistance tool determines that the suggested content does not have good quality, the author-assistance tool continues monitoring user interactions with the document at 202. The quality of the suggested content may be evaluated by a relevance level, as further discussed in FIG. 6. When the author-assistance tool determines that the suggested content has good quality, a notification mechanism is triggered at 206. For example, the notification mechanism triggers a display button (e.g., 113 in FIG. 1) to change display pattern. Other types of notification, such as audio notification, message notification (e.g., instant message, email, pop-up message box, etc.), or the like, may also be used at 206. At 207, the suggested content is provided to the author. For example, the author clicks on a display button when the display pattern changes, which triggers a pop-up window (e.g., see the browser window 120 in FIG. 1) to display the suggested content to the author. Upon providing content to the author at 207, the author-assistance tool continues to monitor user interactions with the document at 202.

Figure 3:
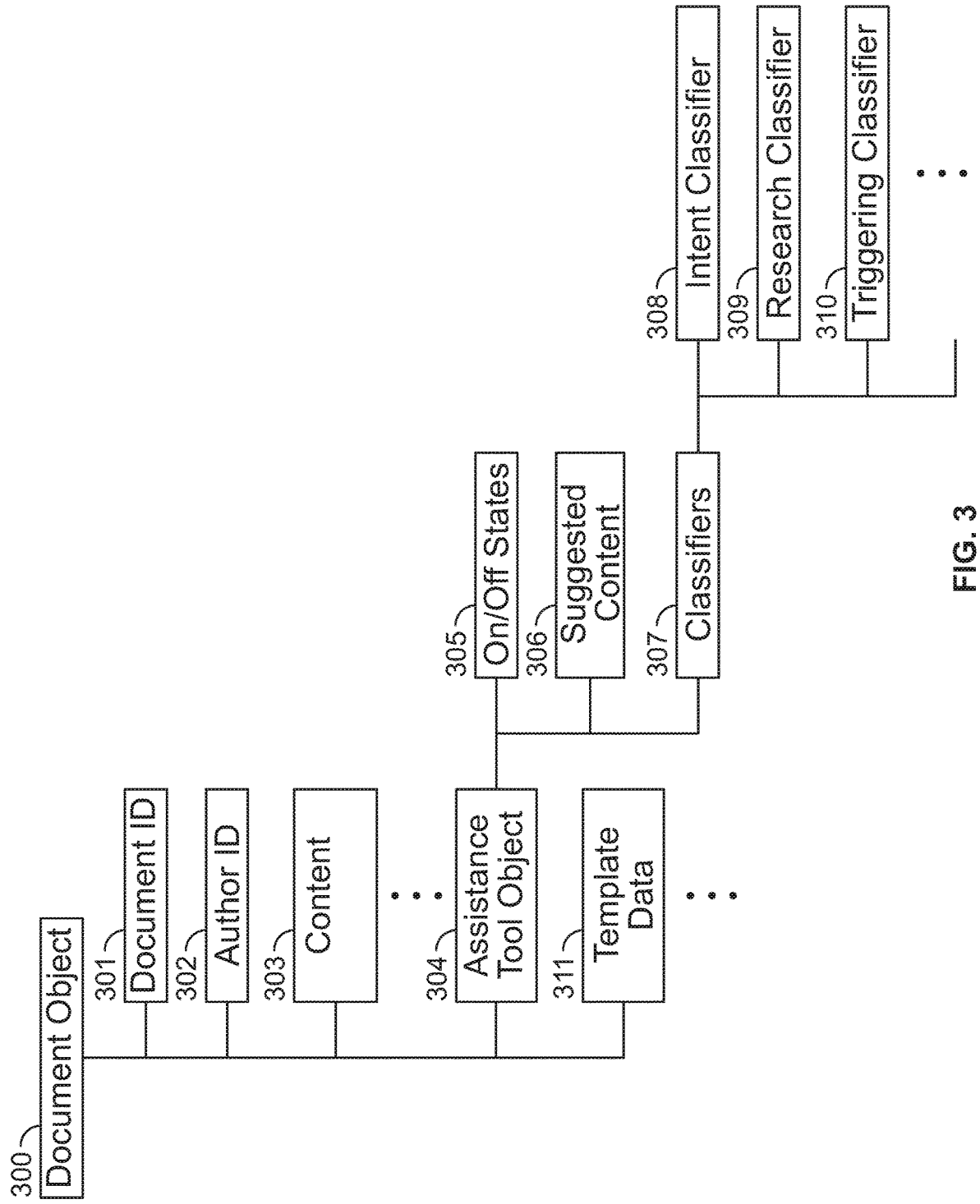
FIG. 3 provides a structural diagram illustrating an example data structure of a document object with an embedded author-assistance tool object, according to some embodiments described herein.

FIG. 3 provides a structural diagram illustrating an example data structure of a document object with an embedded author-assistance tool object, according to some embodiments described herein. A document that is created, opened or edited by an author is represented by a document object 300. The document object 300 includes a number of fields such as but not limited to a document identifier (ID) 301, an author ID 302, a content section 303, and/or the like.

The document object 300 further includes, or is linked to an author-assistance tool object 304. The author-assistance tool object 304 includes an on/off status field 305, a list of suggested content 306, a number of classifiers 307 that describe characteristics of the suggested content 306, and/or the like. The classifiers 307 are employed to evaluate the suggested content 306 and identify whether/when a notification should be triggered to notify the author of suggested content 306. For example, the number of classifiers 307 include, but not limited to an intent classifier 308, a research classifier 309, a triggering classifier 310, and/or the like.

The intent classifier 308 may be assigned a value of "have intent" or "not have intent," which is used to identify whether the author is interested in receiving suggested content. The intent classifier 308 can be determined upon the state of the author or the document, e.g., author-configured settings, whether the author is actively writing on the document, document version, etc. Further description as to how the intent classifier 308 is determined is provided in FIG. 4. The research classifier 309 may be assigned a value of "Yes" or "No," which is used to identify, for example, whether the document has a document type that is on the list of document types for which a content suggestion should be made. For example, the document may need raw data, text, image data, etc. Further description as to how the research classifier 309 is determined is provided in FIG. 5. The triggering classifier 310 is assigned a value of a normalized score that represents a quality level of the suggested content, after an amount of suggested content has been generated by the author-assistance tool. Further description as to how the triggering classifier 310 is determined is provided in FIG. 6. The classifiers 307 may be dynamically updated by the notification mechanism as the author interacts with the document processor and the author-assistance tool continues to perform research for contents.

The document object 300 further includes template data 311, which may appear as part of the metadata of the document object 300. The template data 311 includes data fields indicating information of a template that the document is built from, for example, template ID, template name, title, template type, font type, font size, line space, indent space, and/or the like.

Figure 4:
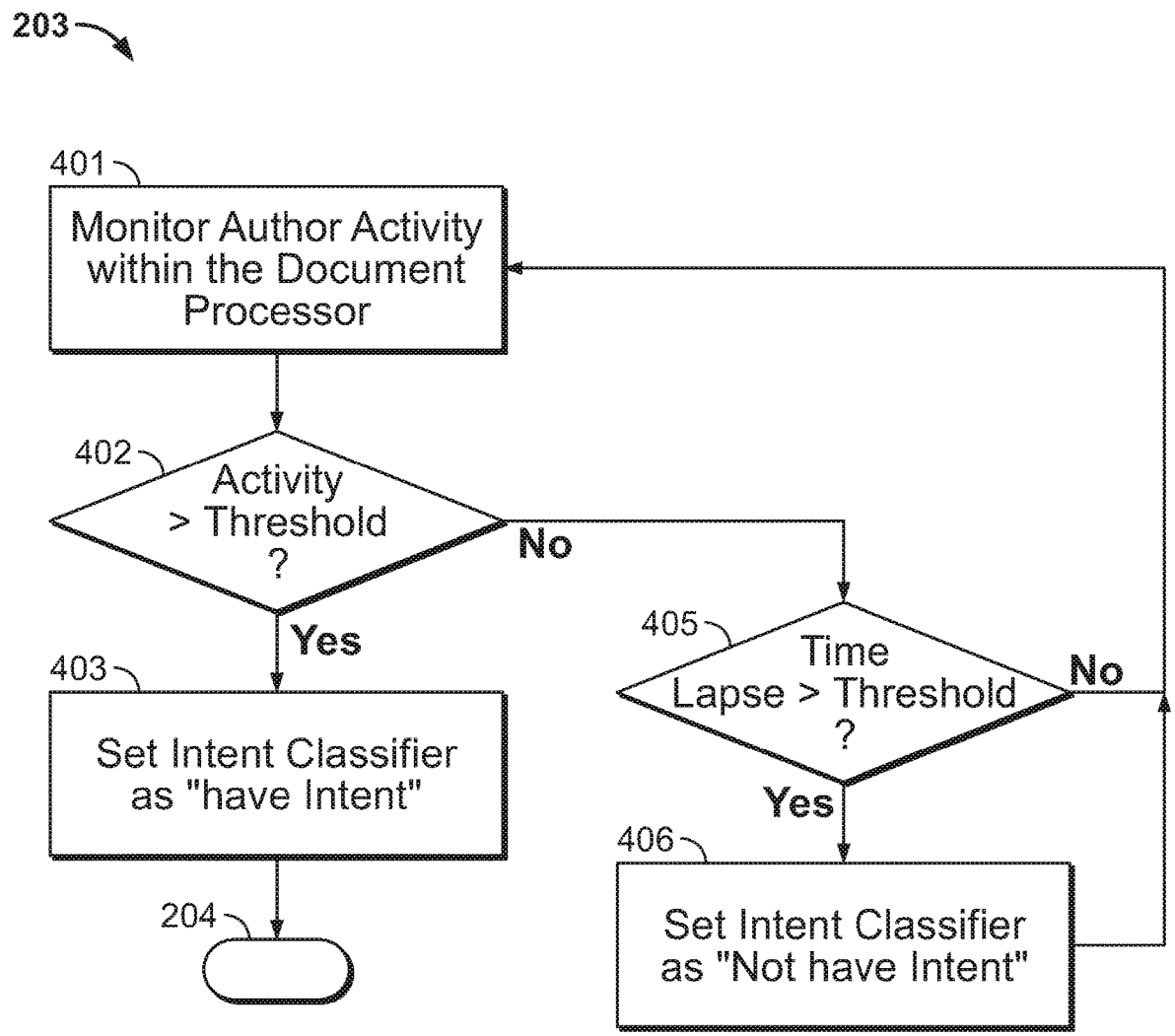
FIG. 4 provides a logic flow diagram illustrating a work flow of determining whether an author has an intent to receive suggested content, according to some embodiments described herein.

FIG. 4 provides a logic flow diagram illustrating a work flow of determining whether an author has an intent to receive suggested content (see determination 203 in FIG. 2), according to some embodiments described herein. At 401, the author-assistance tool may monitor author activity within the document processor. At 402, the amount of author activities is compared to a threshold to determine whether the author may be interested in receiving suggested content. For example, if the author has added a number of N characters (e.g., 400, 800, etc.) to the document within a previous period of time (e.g., the past 10 minutes, the past 20 minutes, etc.), or since opening the document, the author-assistance tool determines the author has an intent to receive suggested content, and then sets the intent classifier as "have intent" at 403.

In some implementations, at 402, different types of author activities are logged to indicate different intent levels. For example, a scrolling action can be identified as relating to "not have intent," while a content-adding action to enter, paste or insert from another document new content into the document being edited can be identified as relating to "have intent." For another example, a user action to open a browser window and search on key terms that relate to a topic of the document being edited can be identified as relating to "have intent." A modification of the format of the document can be identified as relating to "not have intent," or the like. The various types of author activities can each be allocated a normalized weight, with a positive weight allocated to an activity related to "have intent" and a negative weight allocated to an activity related to "not have intent." An aggregated sum of the weights of author activities is then calculated and compared to a threshold at 402. If the sum of author activities is greater than a pre-determined threshold at 402, does not reach the threshold at 402, the intent classifier is set as "have intent" at 403. Otherwise, when the sum of author activities does not meet the pre-determined threshold at 402, the author-assistance tool determines whether the low activity or inactivity lasts for a pre-determined time threshold at 405, e.g., 5 minutes, 10 minutes, etc. If the time lapse has not exceeded the time threshold, the author-assistance tool may continue to monitor author activity at 401. If the time of low author activity has exceeded the time threshold, the author-assistance tool sets the intent classifier as "not have intent" at 406.

In some implementations, the author can configure the author-assistance tool by manually turning on content research. In such event, the intent classifier is updated in response to the author configuration and is set as "have intent."

Figure 5:
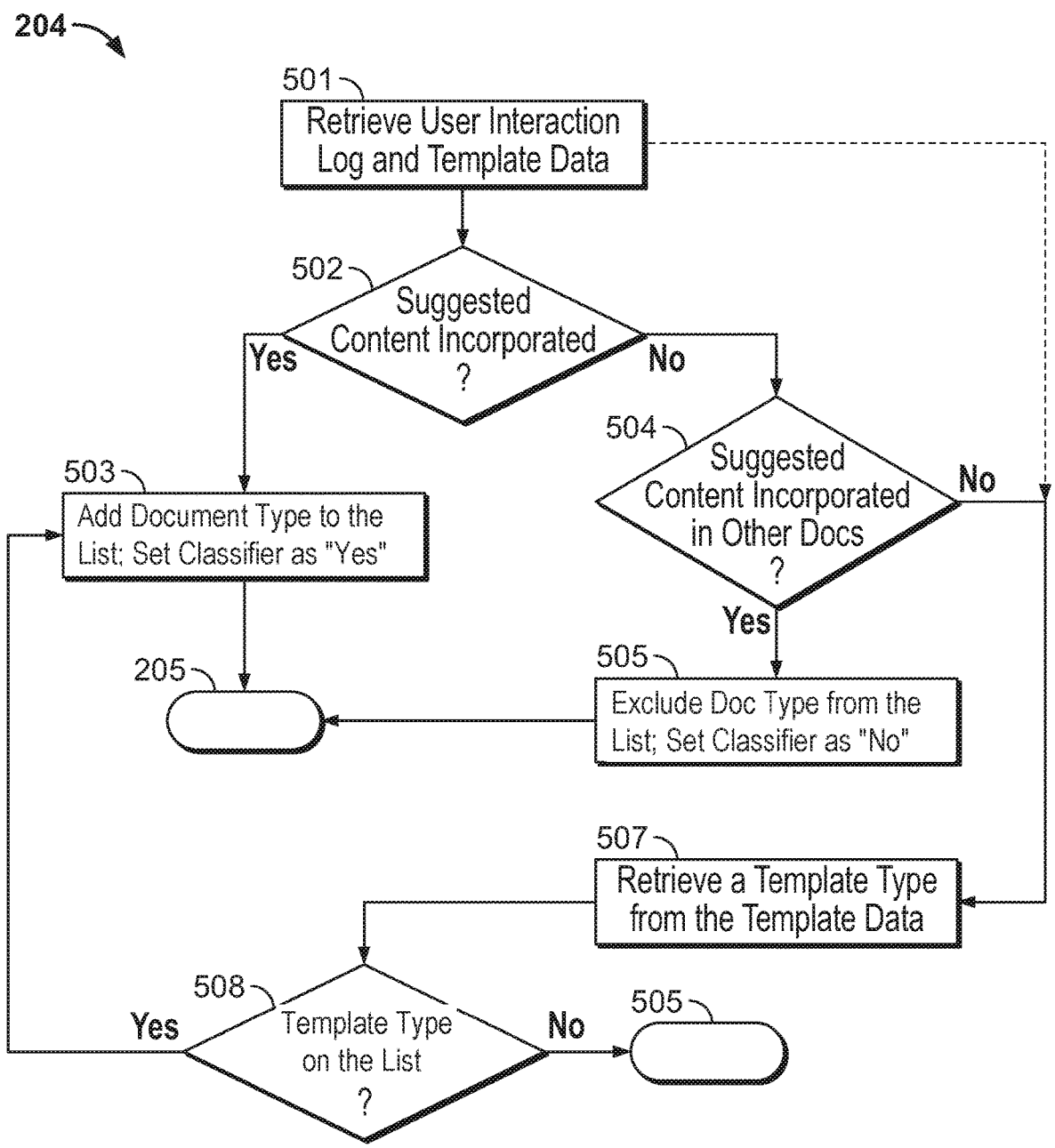
FIG. 5 provides a logic flow diagram illustrating a work flow of determining whether a content suggestion is suitable for the document, for example, whether the document has a document type that is on a list of document types for which content suggestion should be made, according to some embodiments described herein.

FIG. 5 provides a logic flow diagram illustrating a work flow of determining whether a content suggestion is suitable for the document, for example, whether the document has a document type that is on the list of document types for which a content suggestion should be made (see determination 204 in FIG. 2), according to some embodiments described herein. In some implementations, the author-assistance tool uses a machine learning based procedure to build the list of document types for which a content suggestion should be made and configure the research classifier accordingly. At 501, a user interaction log including past author interaction data with suggested content and template data of the document is retrieved as the training set for the machine learning based procedure. For example, the user interaction log includes a number of user interaction entries, each of which includes data fields such as, but not limited to a user ID, a document ID, a timestamp, a suggested content ID, a suggested content description, a user election (accept or decline), and/or the like. At 502, the author-assistance tool determines whether the user interaction log records an incident that a suggested content item is currently adopted by the author to incorporate into the document. If any suggested content item is incorporated, in this example, the research classifier is set as "Yes" and the document type of the document is added to the list of document types for which a content suggestion should be made, at 503. Otherwise, the author-assistance tool determines whether the user interaction log shows the author has a history of adopting suggested contents into other documents, but does not adopt any suggested content associated with the instant document at 504. If the author previously accepted suggested content but does not accept any suggested content for the instant document, the research classifier is set as "No" and the document type of the document is excluded or removed from the list of document types for which a content suggestion should be made, at 505. At 505, the document type of the document may be optionally added to a list of document types for which a content suggestion should not be made.

When the research classifier cannot be determined at 504, the template data of the document is used to determine a document type at 507. The template data may be optionally examined before, after, or in parallel with the evaluation of user interaction log at 502-504, e.g., 501 may go to 507 directly, as shown in the dashed line. A template type is retrieved from the template data of the document at 507. The author-assistance tool determines, in this example, whether the template type is on the list of document types for which a content suggestion should be made at 508.

For example, the list of document types for which a content suggestion should be made may include document types that have a research nature such as a student research report, a technical whitepaper, etc. Documents created from templates that are less research-related such as meeting notes, resumes, etc., are considered to have a non-research nature, for which a content suggestion should not be made. The template used by the document is determined based on the metadata of the document, and template categories can be used to configure the research classifier:

"Research"—
   a. ESSAY
   b. CLASS_NOTES
   c. REPORT
   d. PROJECT_PROPOSAL
"Non-Research"
   a. MEETING_NOTES
   b. LESSON_PLAN
   c. BROCHURE
   d. NEWSLETTER
   e. LETTER
   f. RESUME In addition to the document template, whether a document is research-related can be determined based on a title of the document, a name of the document, key words of the document, or the like. Additional features of a document are used to identify whether a document is a research-related type for which a content suggestion should be made, e.g., density of words in "longer" paragraphs (e.g., a document having paragraphs with at least five sentences is more likely to be a research-related document, etc.), density of words in list items, number of footnotes, number of images (bucketed by size), number of links (bucketed by type of links, internal, web, drive, etc.), heading buzzwords (e.g., "references," "work experience," etc.), token, knowledge graph entities, or the like. The research classifier and the list of document types for which a content suggestion should be made, can be dynamically and progressively set based on the above data sets and features of the document.

In other implementations, user interaction log can also be used to determine whether the document is a research-related document at 508. For example, when the user interaction log contains at least ten positively searches relating to the document, the document is a research-related document. Or when the user interaction log contains no search record relating to the document that has been performed by the author at all, the document is not considered as a research-related document.

As such, in this example, when the document is determined to be a type on the list of document types for which a content suggestion should be made at 508, the research classifier is set as "Yes" at 503. Otherwise, the research classifier is set as "No" at 505.

Figure 6:
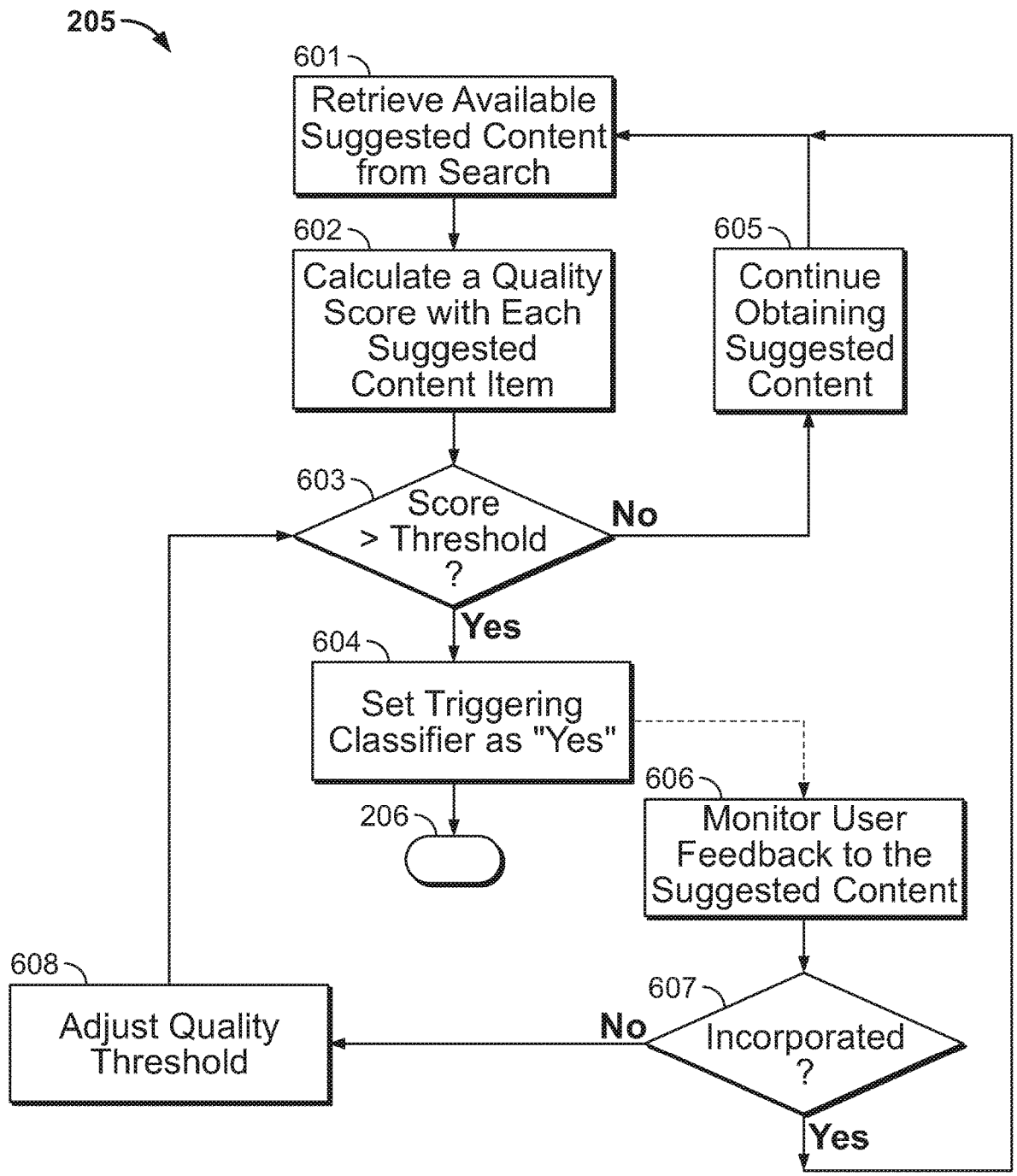
FIG. 6 provides a logic flow diagram illustrating a work flow of determining whether the quality of suggested content is sufficiently good to be provided to the author, according to some embodiments described herein.

FIG. 6 provides a logic flow diagram illustrating a work flow of determining whether the quality of suggested content is sufficiently good to be provided to the author (see determination 205 in FIG. 2), according to some embodiments described herein. At 601, the author-assistance tool retrieves available suggested content from search. At 602, the author-assistance tool calculates a quality score for the available suggested content to configure the triggering classifier. For example, the quality score can be in part based on a relevance level of a content item to a topic that is used to generate the content suggestion—when the author-assistance tool identifies a topic of the document as "Neil Armstrong," and conducts an Internet search based on the topic "Neil Armstrong," the relevance level of 90% of a webpage as a search result returned from Internet search can be used to configure the quality score of the respective webpage as 0.90.

At 603, the quality score associated with the suggested content is compared with a pre-determined threshold. In one implementation, if there is at least one content suggestion item has a quality score above the predetermined threshold at 603, then the currently available suggested content is deemed to have good quality. The triggering classifier is set as positive, and the notification is triggered at 604. In another implementation, a weighted sum of the quality scores of the available suggested content items are evaluated against the pre-determined threshold to determine whether the suggested content is of good quality at 603. When the quality score does not meet the threshold at 603, the author-assistance tool continues obtaining and accumulating suggested content at 605, without notifying the author suggested content is available.

The pre-determined threshold scores can be (optionally) dynamically updated based on feedback of the author. After the notification is triggered at 604 to provide suggested content to the author, the author-assistance tool may monitor user feedback to the suggested content at 606. If the author adopts a suggested content item at 607, the adoption is logged as a positive incident for the pre-determined threshold that was used in triggering the notification of the suggested content item, and the pre-determined threshold may be kept and re-used. If the author does not use any of the suggested content items upon notification at 607, the failure of adoption is logged as a negative incident for the pre-determined threshold that was used in triggering the notification of the suggested content item, and the pre-determined threshold may be adjusted at 608 accordingly. For example, at 608, the quality threshold may be increased to improve the quality of suggested content being provided to the author. The dynamic adjustment of the quality threshold at 606-608 may be periodically, constantly or intermittently implemented to improve the adoption of suggested content.

Figure 7:
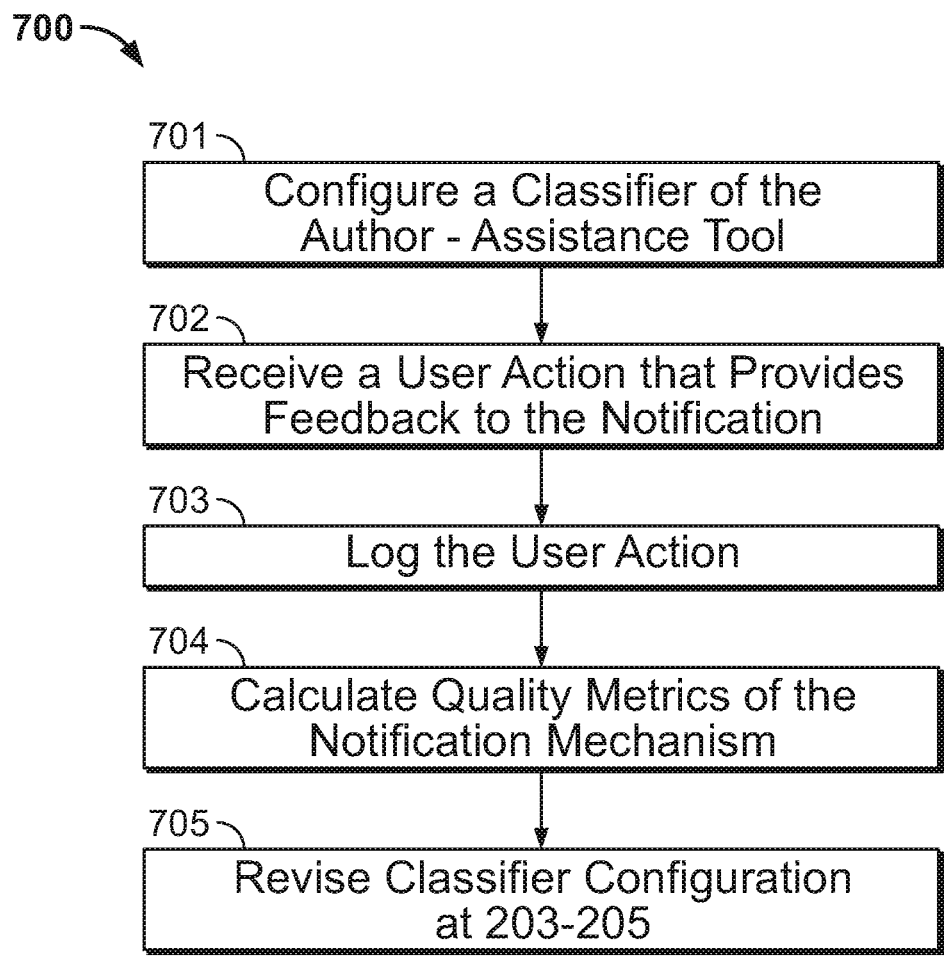
FIG. 7 provides a logic flow diagram illustrating a work flow for dynamically configuring classifiers of the notification mechanism based on quality evaluation of the notification mechanism, according to one or more embodiments described herein.

FIG. 7 provides a logic flow diagram illustrating a work flow of dynamically configuring classifiers of the notification mechanism based on quality evaluation of the notification mechanism, according to one or more embodiments described herein. The configuration of the classifiers associated with the notification mechanism, as discussed in FIGS. 4-6 can be dynamically modified based on a user response feedback system as shown in the work flow diagram 700. The feedback system may take place in parallel to, subsequent to, or prior to the work flow 200 shown in FIG. 2.

At 701, the classifiers associated with the notification mechanism are configured when an author accesses, edits and performs other operations with a document within a document processor, e.g., in a way similar to that described in connection with FIGS. 4-6. At 702, a user action that indicates feedback from the author to the suggested content or the notification of the suggested content is received. For example, the user action may include an action from the author to adopt and incorporate one or more suggested content items into the document, to manually turn off the author-assistance tool after the notification is triggered, to close the browser window (e.g., 120 in FIG. 1) without adopting any suggested content item, to manually enter a search term into a search box (e.g., 107 in FIG. 1) after the browser window is triggered, or the like.

At 703, the user action is logged as indicative of the accuracy of a classifier. For example, a set of pre-defined evaluation rules can be applied to associate the logged user action to whether a current classifier is configured correctly. Example rules may be set as, after the notification of suggested content is provided:

if the author manually turns off the author-assistance tool after notification of suggested content is provided, the intent classifier is incorrect;

if the author incorporates one or more suggested content items, the intent classifier, the research classifier, and the triggering classifiers are all correct; or if the author does not incorporate any suggested content items or manually starts a new search relating to the topic of the document, the intent classifier and the research classifiers are correct, but the triggering classifier is incorrect, or the like.

The rules for evaluating user actions may be pre-defined, and can be dynamically updated by the interaction of author or other users.

At 704, quality metrics of the notification mechanism can be calculated based on the logged user actions. For example, for the research classifier, a precision metric is calculated as (the number of documents marked as "Yes" correctly by the research classifier)/(the total number of documents marked "Yes" by the research classifier). A recall rate is calculated as (the number of documents marked as "Yes" correctly by the research classifier)/(the number of documents that are actually research-related).

In some implementations, 703 and 704 can be recursively performed as a training process to train the configuration of the classifiers and evaluate the performance of the classifier configuration. For example, the user actions logged at 703 can be stored as a set of training data. Characteristics of the document (e.g., document type, document name, document title, key words, identified topic if any, etc.), the configured classifiers with the document, and the user feedback towards suggested content may also be stored as part of the training data. Such training data may be used to dynamically determining and updating a research classifier while the author-assistance tool accumulates suggested content, as discussed in connection with FIG. 5.

At 705, the classifier configuration, e.g., as described in FIGS. 4-6 can be revised and adjusted based at least in part on the quality metrics of the notification mechanism. For example, if the precision metric or the recall rate for research classifier is lower than a pre-determined threshold (e.g., 60%, 70%, etc.), requirements to classify a document as research-related document for which a content suggestion should be made may be relaxed—e.g., instead of requiring at least ten searches to be performed by the author while editing the document to label the research classifier as "Yes," the threshold may be lowered to be seven, eight, or the like.

Figure 8:
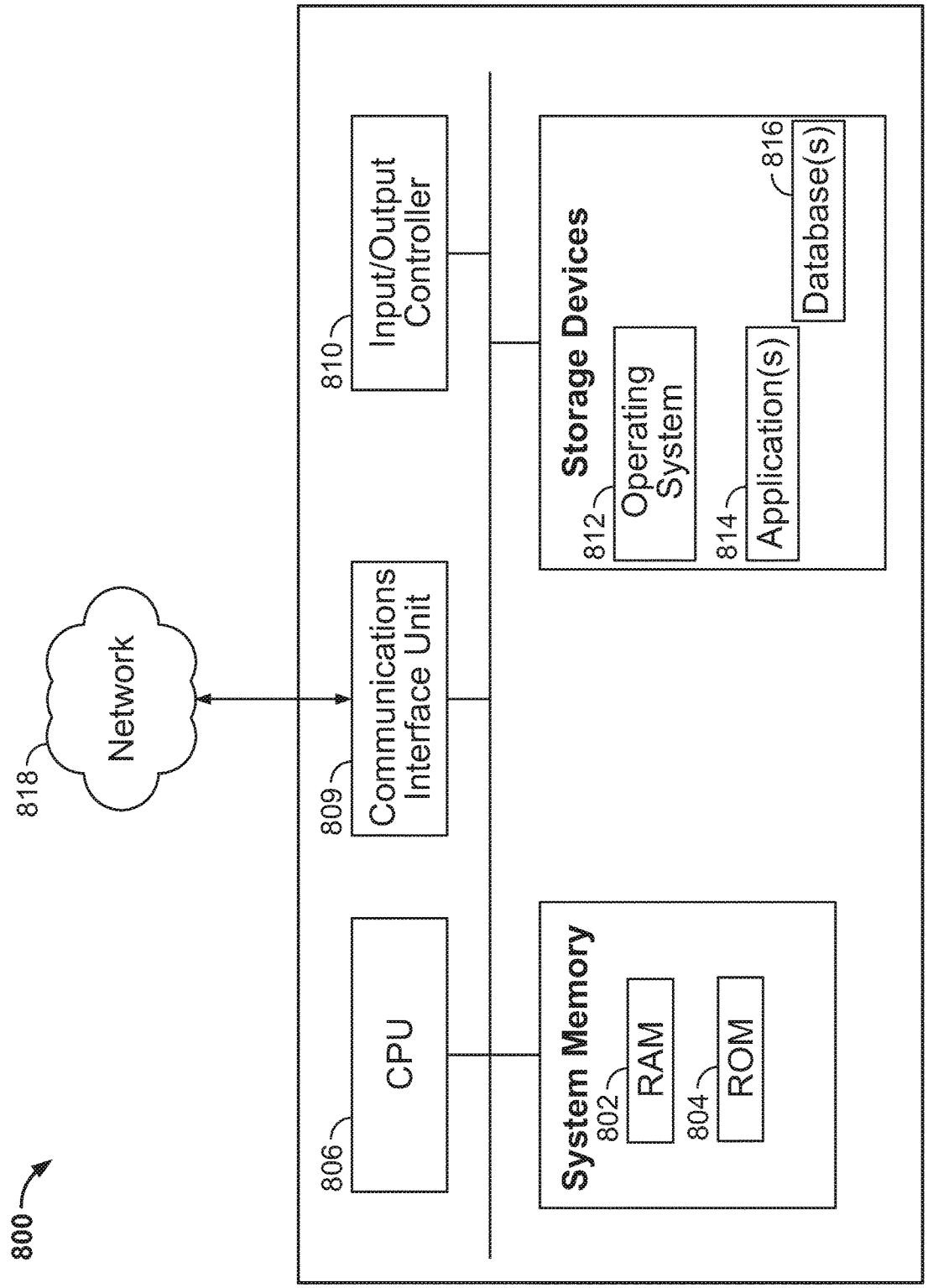
FIG. 8 is a block diagram of a computing device, such as any of the components of the system of FIG. 1, for performing any of the processes described in FIGS. 1-7.

FIG. 8 is a block diagram of a computing device, such as any of the components of the system of FIG. 1, for performing any of the processes and storing any of the objects or other data items described in FIGS. 1-6. Each of the components of these systems may be implemented on one or more computing devices 800. In certain aspects, a plurality of the components of these systems may be included within one computing device 800. In certain implementations, a component and a storage device may be implemented across several computing devices 800.

In some implementations, an author may access the document processor 110 and the browser 120 as described in FIG. 1 via the computing device 800. The computing device 800 includes at least one communications interface unit, an input/output controller 810, system memory, and one or more data storage devices. The system memory includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional stand-alone computer or alternatively, the functions of computing device 800 may be distributed across multiple computer systems and architectures. Alternatively, a computer system may be virtualized to provide the functions of multiple computing devices 800. In FIG. 8, the computing device 800 is linked, via network or local network, to other servers or systems.

The computing device 800 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to Ethernet, WLAN, cellular networks, etc.

The CPU 806 includes a processor, such as one or more conventional microprocessors and one or more supplementary co-processors such as math co-processors, for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device. The data storage device may include an appropriate combination of magnetic, optical or semiconductor memory, and may include, for example, RAM 802, ROM 804, a flash drive, an optical disc such as a compact disc or a hard disk or drive. The CPU 806 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium; or combination of the foregoing. For example, the CPU 806 may be connected to the data storage device via the communications interface unit 808. The CPU 806 may be configured to perform one or more particular processing functions.

The data storage device may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program. For example, the one or more applications 814 may include the document processor 110 and the browser 120 as described in FIG. 1. For another example, the database 816 may be configured to store the document object 300 as described in FIG. 3.

The operating system 812 and applications 814 may be stored, for example, in a compressed, an uncompiled and an encrypted format, and may include computer program code. The instructions of the program may be read into a main memory of the processor from a computer-readable medium other than the data storage device, such as from the ROM 804 or from the RAM 802. While execution of sequences of instructions in the program causes the CPU 806 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. For example, the computer program code may include instructions for the CPU 806 to perform the process of triggering a notification of suggested content as described in FIG. 2, the process of determining whether the author has an intent to receive suggested content as described in FIG. 4, the process of determining whether the document type is on a list of document types for which a content suggestion should be made in the example as described in FIG. 5, the process of determining whether suggested content has good quality as described in FIG. 6, and the process of dynamically updating classifier configuration as described in FIG. 7. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including but not limited to non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, a hard disk, a magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to the main memory, from which the processor retrieves and executes the instructions. The instructions received by the main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, a tree or hierarchical network, or the like. The communications modules can be, for example, modems or Ethernet cards.

As discussed above, computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, an enterprise server or group of servers, one or more desktop computers, one or more laptop computers, etc. Computer system 800 can also be embedded in another device, for example, and without limitation, a mobile telephone, a personal digital assistant (PDA), a mobile audio player, a Global Positioning System (GPS) receiver, a video game console, and/or a television set top box.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for notifying an author that suggested content is available, the method comprising:
   initiating an author-assistance tool for a document processing application that displays, via a user interface (UI) of the document processing application, a document including textual content that is being edited by the author of the document;
   generating suggested content for the document based on data associated with the document that is automatically provided to the author-assistance tool by the document processing application;
   determining a document type of the document;
   determining a quality score of the suggested content;
   determining one or more activities of the author with respect to the document displayed by the document processing application;
   applying a plurality of factors to one or more classifiers to obtain one or more outputs indicating when to notify the author of the suggested content, the plurality of factors comprising the document type of the document, the quality score of the suggested content and the one or more activities of the author with respect to the document, wherein the one or more classifiers use the plurality of factors to determine that (i) the one or more activities of the author with respect to the document indicate that the author is interested in receiving the suggested content, (ii) the document type of the document is on a list of document types for which a content suggestion is to be made, and (iii) the quality score of the suggested content meets a pre-determined quality threshold;
   obtaining the one or more outputs indicating when to notify the author of the suggested content; and
   in response to the one or more outputs indicating that the author is to be notified of the suggested content, causing the UI of the document processing application to be modified to display, independently from the textual content of the document, a notification UI element, which indicates to the author that the suggested content is available without presenting the suggested content to the author, wherein the notification UI element, when selected by the author in the UI of the document processing application, initiates presentation of the suggested content to the author.

2. The method of claim 1, further comprising:
   storing a document object of the document, the document object associated with the one or more classifiers comprising an intent classifier that indicates whether the author is interested in receiving the suggested content, a research classifier that indicates whether the document is a research document which is associated with document types on the list of document types for which the content suggestion is to be made, and a triggering classifier that indicates whether the suggested content has met the pre-determined quality threshold.

3. The method of claim 2, further comprising:
   determining that an amount of the author activities with respect to the document within a period of time is greater than a pre-determined threshold; and
   configuring the intent classifier as positive.

4. The method of claim 3, further comprising:
   determining that the amount of the author activities within the period of time is less than the pre-determined threshold; and
   configuring the intent classifier as negative.

5. The method of claim 2, further comprising:
   determining that a user interaction log includes a number of activities of the author to adopt suggested content into other documents but no activities of the author to adopt suggested content into the document;
   configuring the research identifier as negative; and
   excluding the document type from the list of document types for which the content suggestion is to be made.

6. The method of claim 2, further comprising:
   retrieving template data associated with the document;
   in response to determining from the template data that the document is built upon a template for a research document, configuring the research classifier as positive.

7. The method of claim 6, further comprising:
   in response to determining from the template data that the document is built upon a template for a non-research document, configuring the research classifier as negative.

8. The method of claim 2, further comprising:
   obtaining information relating to any of a format of the document, sample words from the document, a name of the document, a title of the document, or ownership of the document;
   adding the document type to the list of document types for which the content suggestion is to be made;
   determining the document is a research document based on the information; and
   configuring the research classifier as positive.

9. The method of claim 2, further comprising:
   retrieving available suggested content;
   calculating a quality score for a suggested content item from the available suggested content; and
   assigning the quality score to the triggering classifier.

10. The method of claim 9, further comprising:
    calculating the quality score as a relevance level of the suggested content to a topic of the document.

11. The method of claim 1, further comprising:
    receiving a user response indicative of feedback for the suggested content;
    generating a user response log; and
    calculating quality metrics of the suggested content based at least in part on the user response log.

12. The method of claim 11, wherein the quality metrics include a precision metric, and further comprising:
    determining a number of documents correctly identified as having a research-related document type for content suggestion;
    determining a total number of documents identified as having the research-related document type for content suggestion; and
    calculating the precision metric by dividing the number of documents correctly identified as having the research-related document type for content suggestion by the total number of documents identified as having the research-related document type for content suggestion.

13. The method of claim 11, wherein the quality metrics include a recall rate, and further comprising:
    determining a number of documents correctly identified as having a research-related document type for content suggestion;

determining a number of documents that actually have the research-related document type for content suggestion; and calculating the recall rate by dividing the number of documents correctly identified as having a research-related document type for content suggestion by the number of documents that actually have the research-related document type for content suggestion.

14. The method of claim 11, further comprising:
determining whether the intent classifier, the research classifier or the triggering classifier are correctly configured based at least in part on the user response to the suggested content.

15. The method of claim 14, further comprising:
dynamically updating the intent classifier, the research classifier or the triggering classifier based at least in part on the calculated quality metrics when the intent classifier, the research classifier or the triggering classifier is not correctly configured for the document.

16. A system for notifying an author that suggested content is available, the system comprising:
an input/output interface to receive a user interaction relating to a document;
a memory to store the document; and
a processor, coupled to the memory and the input/output interface, to:
initiate an author-assistance tool for a document processing application that displays, via a user interface (UI) of the document processing application, a document being edited by the author of the document;
generate suggested content for the document based on data associated with the document that is automatically provided to the author-assistance tool by the document processing application;
determine a document type of the document to a list of document types for which a content suggestion is to be made;
determine whether a quality score of the suggested content meets a pre-determined quality threshold;
determine one or more activities of the author with respect to the document displayed by the document processing application;
apply a plurality of factors to one or more classifiers to obtain one or more outputs indicating when to notify the author of the suggested content, the plurality of factors comprising the document type of the document, the quality score of the suggested content and the one or more activities of the author with respect to the document, wherein the one or more classifiers use the plurality of factors to determine that (i) the one or more activities of the author with respect to the document indicate that the author is interested in receiving the suggested content, (ii) the document type of the document is on a list of document types for which a content suggestion is to be made, and (iii) the quality score of the suggested content meets a pre-determined quality threshold; and
in response to the one or more outputs indicating that the author is to be notified of the suggested content, cause the UI of the document processing application to be modified to display, independently from the textual content of the document, a notification UI element, which indicates to the author that the suggested content is available without presenting the suggested content to the author, wherein the notification UI element, when selected by the author in the UI of the document processing application, initiates presentation of the suggested content to the author.

17. The system of claim 16, wherein the processor is further to:
receive a user response indicative of feedback for the suggested content;
generate a user response log; and
calculate quality metrics of the suggested content based at least in part on the user response log.

18. The system of claim 16, wherein the processor is further to:
store a document object of the document, the document object associated with the one or more classifiers comprising an intent classifier that indicates whether the author is interested in receiving the suggested content, a research classifier that indicates whether the document is a research document which is associated with document types on the list of document types for which the content suggestion is to be made, and a triggering classifier that indicates whether the suggested content has met the pre-determined quality threshold.

19. A processor-readable non-transitory storage medium storing processor-executable instructions, which when executed by a processor, cause the processor to perform operations to notify an author that suggested content is available, the operations comprising:
initiating an author-assistance tool for a document processing application that displays, via a user interface (UI) of the document processing application, a document being edited by the author of the document;
generating suggested content for the document based on data associated with the document that is automatically provided to the author-assistance tool by the document processing application;
determining a document type of the document;
determining a quality score of the suggested content;
determining one or more activities of the author with respect to the document displayed by the document processing application;
applying a plurality of factors to one or more classifiers to obtain one or more outputs indicating when to notify the author of the suggested content, the plurality of factors comprising the document type of the document, the quality score of the suggested content and the one or more activities of the author with respect to the document, wherein the one or more classifiers use the plurality of factors to determine that (i) the one or more activities of the author with respect to the document indicate that the author is interested in receiving the suggested content, (ii) the document type of the document is on a list of document types for which a content suggestion is to be made, and (iii) the quality score of the suggested content meets a pre-determined quality threshold; and
in response to the one or more outputs indicating that the author is to be notified of the suggested content, causing the UI of the document processing application to be modified to display, independently from the textual content of the document, a notification UI element, which indicates to the author that the suggested content is available without presenting the suggested content to the author, wherein the notification UI element, when selected by the author in the UI of the document processing application, initiates presentation of the suggested content to the author.

20. The processor-readable non-transitory storage medium of claim 19, wherein the operations further comprise:
  storing a document object of the document, the document object associated with the one or more classifiers comprising an intent classifier that indicates whether the author is interested in receiving the suggested content, a research classifier that indicates whether the document is a research document which is associated with document types on the list of document types for which the content suggestion is to be made, and a triggering classifier that indicates whether the suggested content has met the pre-determined quality threshold.

* * * * *